United States Patent Office 3,338,801
Patented Aug. 29, 1967

3,338,801
AZEOTROPIC DISTILLATION OF A LINEAR OCTATRIENE-VINYLCYCLOHEXENE MIXTURE WITH ACETONITRILE
Julian Feldman, Cincinnati, Ohio, assignor to National Distillers and Chemical Corporation, New York, N.Y., a corporation of Virginia
No Drawing. Filed June 25, 1965, Ser. No. 467,099
10 Claims. (Cl. 203—60)

This invention relates to the separation of closely boiling organic compounds. More particularly, the invention pertains to the separation of dimers of 1,3-butadiene and especially to the separation of a vinylcyclohexene such as 4-vinylcyclohexene from a linear octatriene such as 1,3,7-octatriene or 1,3-trans, 6-cis-octatriene.

Linear octatrienes are valuable chemical intermediates, particularly as monomers for the preparation of ethylene-propylene-octatriene terpolymer rubbers and intermediary copolymers of propylene and octatrienes. The linear octatrienes can be obtained by the dimerization of 1,3-butadiene. In addition to the desired linear octatrienes, the dimerization process results in the formation of less desirable by-products, some of which are also dimers of the butadiene. Serious problems are encountered in attempting to separate the linear octatriene in a high state purity from these by-product dimers by fractional distillation. More specifically, a vinylcyclohexene by-product, 4-vinyl-cyclohexene, has a boiling point (127° C.) very close to that of 1,3,7-octatriene (B.P. 125° C.) and 1,3-trans, 6-cis-octatriene (B.P. 132° C.). Mixtures of these compounds are produced respectively in both the phenol and alcohol catalyzed dimerizations of 1,3-butadiene. Obviously the closeness of the boiling point of the by-product 4-vinyl cylohexene to the boiling points of the linear octatrienes makes it extremely difficult to achieve effective separations utilizing conventional procedures.

One object of this invention is to provide a process for the separation of linear octatrienes from a dimer of butadiene such as vinylcyclohexene.

Another object of this invention is to provide a process for the separation by means of fractional distillation of linear octatrienes from 4-vinylcyclohexene.

It is a further object of this invention to provide a process for the recovery of 1,3,7-octatriene and 1,3-trans, 6-cis-octatriene in a high state of purity from the reaction product mixtures obtained by the catalytic dimerization of butadiene.

These and other objects of this invention will become readily apparent from the ensuing description and illustrative embodiments.

In accordance with the present invention, this is provided a process for the separation of 4-vinylcyclohexene from mixtures thereof with 1,3,7-octatriene or 1,3-trans, 6-cis-octatriene by the azeotropic distillation of such mixtures with acetonitrile. It has been found that the distillate will comprise acetonitrile azeotropes containing the 4-vinylcyclohexene, and that the residue will comprise the octatriene.

In general, the reaction product mixture obtained from the dimerization step is first fractionated using a column of medium efficiency, i.e. at least 10 theoretical plates. The cut boiling between 122° and 128° C., in the case of the phenol cocatalyzed dimerization, contains the mixture of 4-vinylcyclohexene and 1,3,7-octatriene; whereas in the case of the alcohol cocatalyzed dimerization, the cut boiling between 126° and 133° C. contains the mixture of 4-vinylcyclohexene and 1,3-trans, 6-cis-octatriene. The respective cuts are initially mixed with acetonitrile in the proportion of about 5 to 50 times and preferably about 10 to 20 times, the weight of vinylcyclohexene contained therein. The amount of acetonitrile employed may also be expressed in terms of the volume of hydrocarbon feed mixture. Accordingly, the volume ratio of acetonitrile to hydrocarbons may range from about 1/3 to 10/1, and preferably about 1/1 to 4/1. The resulting solution is then distilled through a column of at least 10 plates, and preferably from 10 to 40 theoretical plates. An azeotrope of acetonitrile, boiling at 79° C., and containing about 11% by weight of vinylcyclohexene together with smaller amounts of the octatriene comes over first. The next fraction which comes over is an azeotrope of acetonitrile and the octatriene, containing small amounts of vinylcyclohexene. In one case, the azeotrope contains 9.5% by weight of 1,3,7-octatriene and boils at 80.5° C., whereas in the other case the azeotrope contains 5% by weight of 1,3-trans, 6-cis-octatriene and boils at 81° C. After removal of the vinylcyclohexene in the azeotropes, the still pot contains the bulk of the octatriene plus excess acetonitrile. The octatriene can then be recovered by diluting with water at which point the acetonitrile goes into the water phase and the hydrocarbon floats on top. The washed hydrocarbon phase can then be dried and distilled to recover pure hydrocarbon. Similarly, the vinylcyclohexene may be recovered from the distillate by washing with water.

Acetonitrile can be recovered from the aqueous layer by distillation to recover an acetonitrile-water azeotrope from which the water can be removed by a drying agent, and the dry acetonitrile then recycled to the operation.

The use of acetonitrile as an azeotropic agent for separating hydrocarbon mixtures is not new. For example, in U.S. 2,848,387, azeotropic distillation with acetonitrile is employed to separate aromatic hydrocarbons from non-aromatic hydrocarbons wherein an azeotrope of the acetonitrile and the non-aromatic hydrocarbon is distilled overhead. Nevertheless, each binary system of hydrocarbons presents its own special problems so as to render the results unpredictable, and in the systems of the present invention it is surprising and unexpected, in view of the closeness of boiling points of the vinylcyclohexene and octatriene azeotropes of acetonitrile, as well as structural similarities, that complete separation would be possible.

While the azeotropic compositions and boiling points set forth above are for distillations under atmospheric pressure, the fractionations may be carried out under reduced pressures, e.g. about 10 to 700 mm. Hg. Since azeotrope compositions vary with the pressures under which distillation is conducted, the fractionations under reduced pressure may be advantageously used to obtain optimum concentrations and yields. The distillation may also be carried out in a continuous manner whereby the feed mixture containing the acetonitrile is introduced at a position in the distillation column so that the overhead will contain all of the vinylcyclohexene and acetonitrile and the bottoms product will be essentially pure octatriene.

It is a further advantage of the present process, however, that the hydrocarbons can be separated by distillation at atmospheric pressure and at temperatures considerably below their normal boiling points thereby reducing an undesirable tendency to polymerize.

The invention will be more fully understood from the following illustrative embodiments.

EXAMPLE I 260 ml. of a mixture of dimers containing 90% by weight of 1,3,7-octatriene and 10% by weight of 4-vinylcyclohexene were mixed with 550 ml. of anhydrous acetonitrile and distilled in a 7 ft. 1″ diameter column having approximately 40 theoretical plates. Fractions were collected and analyzed, with the results shown below.

| Fr. | Vol. ml. | Temp., °C. | | Reflux Ratio | Composition, percent | | |
|---|---|---|---|---|---|---|---|
| | | Top | Bottom | | Acetonitrile | VCH | 1,3,7-octa-triene |
| 1 | 3 | 63.5 | 83 | 30:1 | | | |
| 2 | 6 | 71.5 | 83 | | 85 | 9 | 6 |
| 3 | 10 | 78.5 | 83 | | 86 | 10.1 | 3.9 |
| 4 | 20 | 79 | 83 | | 86 | 10 | 4 |
| 5 | 22 | 79.5 | 84 | | 84 | 11.2 | 4.8 |
| 6 | 24 | 80 | 84 | | 86 | 5 | 9 |
| 7 | 25 | 80 | 84 | | 88 | 3.2 | 8.8 |
| 8 | 10 | 80.5 | 84 | | 88 | 2.7 | 9.3 |
| 9 | 15 | 80.5 | 84.5 | | 89 | 2 | 9 |
| 10 | 18 | 80.5 | 85 | | 89 | 1.5 | 9.5 |
| 11 | 5 | 80.5 | 85 | | 89.5 | .5 | 10 |
| 13 | 25 | 80.5 | 85 | 10:1 | 73 | 0 | 27 |
| Residue | | | | | | | |

The residue was washed with water several times leaving 206 ml. of the hydrocarbon. This was dried and distilled to give 139 g. of product boiling between 124°–126° C. There was 1 g. of forerun and 12 g. residue. Analysis of the heart cut by gas chromatograph showed no detectable impurity i.e., 99.9% pure 1,3,7-octatriene.

EXAMPLE II 60 ml. of a hydrocarbon mixture containing 18% by weight of 4-vinylcyclohexene and 79% by weight of 1,3-trans,-6-cis-octatriene was mixed with about 200 ml. anhydrous acetonitrile and distilled through a 7 ft. column (40 theoretical plates) with the following results:

| Fr. | Vol. ml. | Temp., °C. | | Reflux Ratio | Composition, percent | | |
|---|---|---|---|---|---|---|---|
| | | Top | Bottom | | Acetonitrile | VCH | 1,3-trans, 6-cis-octa-trienne |
| 1 | 4 | 72 | 82.8 | 30:1 | 80 | 20 | 0 |
| 2 | 2 | 75 | 82 | | 80 | 20 | 0 |
| 3 | 10 | 78.5 | 82 | | 80 | 20 | 0 |
| 4 | 12 | 80 | 82 | | 96 | 3 | 1.2 |
| 5 | 15 | 80 | 82 | 20:1 | 96 | 1.3 | 2.6 |
| 6 | 10 | 81 | 83 | | 86 | 0 | 13.5 |
| Residue | | | | | | | |

The residue was distilled with water, washed with water and dried to give an oil layer of 33 gms. Analysis by gas chromatography showed only one component, the 1,3-trans-6-cis-octatriene.

The above data show that acetonitrile can be effectively employed for separating vinylcyclohexene from linear octatrienes by azeotropic distillation. More specifically, it has been demonstrated that when 1,3,6-octatriene and the vinylcyclohexene are present in the hydrocarbon mixture, the latter is recovered overhead in the form of a vinylcyclohexene acetonitrile azeotrope. Substantially, none of 1,3,6-octatriene is found in the overhead fraction. When on the other hand, the hydrocarbon feed mixture comprises vinylcyclohexene and 1,3,7-octatriene, a small portion of the latter compound will appear overhead because it forms a 10% azeotrope with acetonitrile. However, this azeotrope is sufficiently less volatile than the vinylcyclohexene azeotrope so that during distillation, after removing a heads cut containing all of the vinylcyclohexene and a small portion of the linear octatriene, the bulk of the latter compound is recovered from the still bottoms in a pure form.

While particular embodiments of this invention are shown above, it will be understood that the invention is obviously subject to variations and modifications without departing from its broader aspects. Thus, for example, the distillation equipment may be of conventional design and operation. It is also possible to utilize a hydrocarbon feed mixture having a somewhat broader boiling point temperature range, e.g. from about 115° to 140° C., or higher. Also varying amounts of water may be added to the acetonitrile up to its azeotrope composition (16.3% water by wt.) with the possibility of improving the separation.

What is claimed is:

1. A process for the separation of a linear octatriene from a mixture thereof with vinylcyclohexene which comprises adding to said mixture acetonitrile; azeotropically distilling the resulting solution to obtain a distillate containing substantially all of the vinylcyclohexene and a residue containing the linear octatriene.

2. The process of claim 1 wherein the acetonitrile is added in an amount equal to about 5 to 50 times the weight of the vinylcyclohexene in said mixture of vinylcyclohexene and linear octatriene.

3. The process of claim 1 wherein the vinylcyclohexene is 4-vinylcyclohexene, and the linear octatriene is 1,3,7-octatriene.

4. The process of claim 1 wherein the vinylcyclohexene is 4-vinylcyclohexene and the linear octatriene is 1,3-trans, 6-cis-octatriene.

5. A process for obtaining 1,3,7-octatriene from a mixture thereof with 4-vinylcyclohexene which comprises adding to said mixture an excess of acetonitrile, based on the weight of the 4-vinylcyclohexene in said mixture, azeotropically distilling the resulting solution to obtain a distillate containing substantially all of the 4-vinylcyclohexene and a residue containing the 1,3,7-octatriene, washing said residue with water to remove the acetonitrile therefrom, and recovering substantially pure 1,3,7-octatriene from said washed residue.

6. The process of claim 5 wherein said azeotropic distillation is carried out through a column having at least 10 theoretical plates.

7. The process of claim 5 wherein said azeotropic distillation is carried out under atmospheric pressure.

8. A process for obtaining 1,3-trans, 6-cis-octatriene from a mixture thereof with 4-vinylcyclohexene which comprises adding to said mixture an exess of acetonitrile, based on the weight of the 4-vinylcyclohexene in said mixture, azeotropically distilling the resulting solution to obtain a distillate containing substantially all of the 4-vinylcyclohexene and a residue containing the 1,3-trans, 6-cis-octatriene, washing said residue with water to remove the acetonitrile therefrom, and recovering substantially pure 1,3-trans,6-cis-octatriene from said washed residue.

9. The process of claim 8 wherein said azeotropic distillation is carried out through a column having at least 10 theoretical plates.

10. The process of claim 8 wherein said azeotropic distillation is carried out under atmospheric pressure.

References Cited

UNITED STATES PATENTS 3,284,529  11/1966  Feldman et al. _____ 260—677

DELBERT E. GANTZ, *Primary Examiner.*

H. LEVINE, *Assistant Examiner.*